United States Patent Office 3,560,509
Patented Feb. 2, 1971

3,560,509
O-(1-ADAMANTANECARBONYL)-SCOPOLAMINE
Robert B. Moffett, Kalamazoo, Mich., assignor to
The Upjohn Company, Kalamazoo, Mich.
No Drawing. Filed Feb. 19, 1969, Ser. No. 800,752
Int. Cl. C07d 43/06
U.S. Cl. 260—292                              3 Claims

ABSTRACT OF THE DISCLOSURE

O-(1-adamantanecarbonyl) - scopolamine (including acid addition salts, quaternary ammonium salts, and the N-oxide) prepared by the reaction of 1-adamantanecarbonyl chloride and scopolamine useful as an anticholinergic, mydriatic, antiperspirant, antispasmodic, antisectory.

BRIEF SUMMARY OF INVENTION

This invention relates to the new and useful compound O-(1-adamantanecarbonyl)-scopolamine including acid addition salts, quaternary ammonium salts and the N-oxide thereof.

DETAILED DESCRIPTION

The free base compound according to the present invention can be represented by the following structural formula:

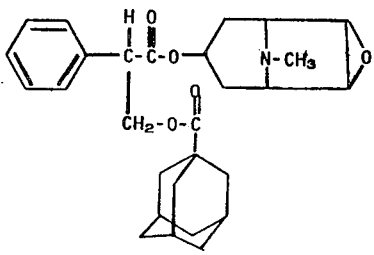

The invention also includes the N-oxide, acid addition salts, and quaternary ammonium salts of the Formula I compound, wherein the salts have a pharmacologically acceptable anion.

The compound of the Formula I is prepared starting with the commercially available 1-adamantanecarboxylic acid which its first converted to 1-adamantanecarbonyl chloride with thionyl chloride.

The second starting material is scopolamine in the form of the free base or the various acid addition salts, such as the hydrobromide, hydrochloride, hydroiodide, nitrate, sulfate, and the like.

The 1-adamantanecarbonyl chloride and scopolamine are reacted together in the presence of a proton acceptor, for example pyridine, triethylamine, diisopropylethylamine, sodium carbonate, sodium hydroxide and the like. A solvent, for example, benzene, diethyl ether, tetrahydrofuran, water, dimethylformamide, dioxane, or mixtures of these may be employed if desired. The reaction mixture is then mixed with a strongly basic aqueous solution and the free base is extracted with diethyl ether or other suitable water immiscible organic solvent, e.g., benzene, chloroform and the like.

Acid addition salts of the compound of the Formula I can be prepared by neutralization of the free base with the appropriate amount of an inorganic or organic acid, examples of which are hydrochloric, hydrobromic, sulfuric, nitric, phosphoric, acetic, lactic, benzoic, salicylic, glycolic, succinic, tartaric, maleic, malic, pamoic, cyclohexanesulfamic, citric and methanesulfonic acids, and like acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of the free base, the acid, and the acid addition salt. If the acid is soluble in water, the free base can be dissolved in water containing an equivalent amount of the acid, and thereafter, the water can be removed by evaporation; in some instances, the salt precipitates from the aqueous solution, particularly when cooled, and evaporation is not necessary. If the acid is soluble in a relatively nonpolar solvent, for example, diethyl ether or diisopropyl ether, separate solutions of the acid and free base in such a solvent can be mixed in equivalent amounts, whereupon the acid addition salt will usually precipitate because of its relatively low solubility in the nonpolar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free base.

Quaternary ammonium salts are prepared by reacting the free base with an alkyl or alkenyl derivative of a pharmacologically acceptable anion, such as methyl bromide, allyl chloride, ethyl bromide, methyl iodide, dimethyl sulfate, and the like, in an inert solvent such as acetone, methyl ethyl ketone, or acetonitrile.

Since the pharmacological activity of the compound of the Formula I is due to the cation, any anion which is pharmacologically acceptable can be used.

The N-oxide is prepared by reacting the free base with a peroxidizing agent, such as hydrogen peroxide, peracetic acid, perbenzoic acid and the like, in an inert solvent such as water, methanol, ethanol, acetone, acetic acid, and the like.

The compounds of the Formula I have useful pharmacological activity, primarily anticholinergic, and can be used as mydriatics, antiperspirants, antispasmodics and antisecretory agents. The compounds are also CNS stimulants.

The compounds can be administered topically for antiperspirant action, or orally and parenterally for anticholinergic action to animals both mammalian, e.g., rats, mice and dogs, or avian, e.g., chickens.

Example 1.—O-(1-adamantanecarbonyl)-scopolamine and hydrochloride thereof

A solution of 12.6 grams (0.07 mole) of 1-adamantanecarboxylic acid in 30 ml. of thionyl chloride was refluxed for 2.2 hours. The excess thionyl chloride was removed in vacuo. Then 50 ml. of benzene was added and removed, giving crude 1-adamantanecarbonyl chloride.

The 1-adamantanecarbonyl chloride was dissolved in 10 ml. of benzene and added to a suspension of 19.22 grams (0.05 mole) of dry scopolamine hydrobromide in 50 ml. of dry pyridine under nitrogen. The solid dissolved on warming for a few minutes on a steam bath and on cooling another solid separated. After standing at room temperature overnight, the mixture was dissolved in a mixture of cold dilute aqueous sodium carbonate and ether. The aqueous layer was made strongly basic with sodium hydroxide and extracted twice with ether. The combined ether extracts were washed successively with water and saturated aqueous sodium chloride solution and dried over anhydrous sodium sulfate. Filtration and evaporation of the solvent in vacuo and then overnight under high vacuum at 40° C., gave O-(1-adamantanecarbonyl)-scopolamine as a light yellow gum.

The gummy free base was dissolved in 500 ml. of absolute ether and acidified with ethereal hydrogen chloride, giving 27.5 grams of white solid. The white solid was dissolved in a mixture of 700 ml. of acetone and 40 ml. of methanol. This solution was concentrated to about 300 ml. by boiling and then diluted to one liter with absolute ether. The resulting solid (22.8 grams, M.P. 212–220° C.) was recrystallized from 150 ml. of 2-propanol (filtered hot) to provide 19.6 grams (78% theory) of O-(1-adamantanecarbonyl)-scopolamine hydrochloride as white crystals having a M.P. of 218–221° C. (dec.).

Analysis.—Calc'd for $C_{28}H_{36}ClNO_5$ (percent): C, 66.99; H, 7.23; Cl, 7.06; N, 2.79. Found (percent): C, 66.90; H, 7.56; Cl, 7.11; N, 2.80.

Example 2.—O-(1-adamantanecarbonyl)-scopolamine methobromide

An aqueous solution of 5.02 grams (0.01 mole) of O-(1-adamantanecarbonyl)-scopolamine hydrochloride was treated with an aqueous solution of sodium carbonate to convert the salt to the free base and extracted with ether. The ether solution was washed successively with water and saturated aqueous sodium chloride solution and evaporated to dryness in vacuo to provide the gummy free base. The free base was dissolved in 25 ml. of methyl ethyl ketone and cooled. To this was added 10 ml. of cold methyl bromide; the flask was stoppered, clamped, and allowed to stand at room temperature for three days. Solid started to separate the first few minutes. The product was collected on a filter, washed with methyl ethyl ketone and absolute ether and dried to provide 5.5 grams (98% theory) of O-(1-adamantanecarbonyl)-scopolamine methobromide as white crystals having a melting point of 226.5–227.5° C. (dec.).

Analysis.—Calc'd for $C_{29}H_{38}BrNO_5$ (percent): C, 62.14; H, 6.83; Br, 14.26; N, 2.50. Found (percent): C, 62.27; H, 6.98; Br, 14.36; N, 2.57.

I claim:
1. A compound of the formula:

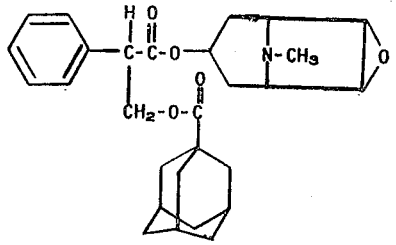

including pharmaceutically acceptable acid addition salts, lower-alkyl quaternary ammonium salts and the N-oxide thereof.

2. A compound of claim 1 in the form of the hydrochloride.

3. A compound of claim 1 in the form of the methobromide.

References Cited

UNITED STATES PATENTS

| | | | |
|---|---|---|---|
| 3,312,709 | 4/1967 | Kilmer | 260—292 |
| 3,472,861 | 10/1969 | Zeile et al. | 260—292 |

ALAN L. ROTMAN, Primary Examiner

U.S. Cl. X.R.

260—999